Sept. 6, 1966 R. F. SCHAUER 3,271,745

REGISTER SEARCH AND DETECTION SYSTEM

Filed Sept. 20, 1962 3 Sheets-Sheet 1

INVENTOR
RALPH F. SCHAUER

BY [signature]
AGENT

REGISTER SEARCH AND DETECTION SYSTEM

Filed Sept. 20, 1962 3 Sheets-Sheet 3

United States Patent Office 3,271,745

Patented Sept. 6, 1966

3,271,745

REGISTER SEARCH AND DETECTION SYSTEM

Ralph F. Schauer, Hawthorne, N.Y., assignor to International Business Machines Corporation, New York, N.Y., a corporation of New York Filed Sept. 20, 1962, Ser. No. 224,966
6 Claims. (Cl. 340—172.5)

This invention relates to information retrieval systems and, more particularly, to a circuit for starting at any stage of a register and searching the register in either direction to detect the location of particular bits.

Circuits for interrogating registers are well known in the prior art but none of these circuits are capable of entering the register to be scanned at any stage of the register and of continuing the search in either direction until a desired bit of information is located.

The search circuit of this invention may, for example, be utilized in a random access memory system of the type in which information is located on the basis of its position in the data organization. For example, if it is known that the desired information is stored in the third field of each record, the device will count down three fields from the beginning of each record and read this field out regardless of the memory address in which this information happens to be located. But, while this system does allow the use of variable field lengths, and, therefore, the full use of available memory locations, it requires that some means be provided to indicate where one record ends and the other begins, where one field ends and where another begins, etc. While, in the above example, the organizational basis is records and fields, similar problems are presented when some other organizational basis is used, as, for example, paragraphs, sentences and phrases.

One way of solving the above problem is to place data identifiers in the data sequence to indicate and separate the various levels or orders of data classification. This scheme, however, ties up a large number of memory words. A more promising scheme is to employ an extra core plane for each order of organizational classification (i.e., a plane for records and a plane for fields), there being one core in each of the planes corresponding to each word in the memory. For each word in the memory where a particular order of classification starts, a bit is stored in the corresponding core of the extra plane associated with that order of classification and in the corresponding core of each plane associated with the lower orders of classification.

With data indicators stored in auxiliary planes as described above, a particular bit of information may be found, provided its position in the data organization is known, by first scanning the core plane associated with the highest order of classification to find the memory address in which the highest order of classification for the desired information starts, then dropping down to the core in the next highest order plane which corresponds to this address and continuing the search until the required number of data identifiers have been found in this plane; and so on until the desired address is located. While the search generally proceeds in only one direction, it is possible that the search might also have to be conducted in the opposite direction. For example, suppose it is desired to locate next-to-the-last field in the second record of a particular block of data. Here the search proceeds in the first plane until the third record identifier is found, and then back in the other direction in the next plane until the first field identifier is found.

It is, therefore, seen that the search circuitry for such a memory device must be capable of initiating a search in the cores of the identifier planes, or in any other register in which the identifier bits are stored, at any desired position and must be capable of searching the register in either direction. The circuit must also be capable of generating an output signal when a bit is found which signal may be encoded to indicate the corresponding memory address. The search circuit must also be capable of continuing the search to succeeding positions if the located address is not the desired one.

It is, therefore, an object of this invention to provide a circuit which is capable of starting a search at any selected stage of a register and of continuing the search in either direction until a desired information bit is located.

Another object of this invention is to provide a register search and detection system of the type described above which, when a bit is detected in a given stage of the register, will generate an output signal which indicates the address of the given stage.

A further object of this invention is to provide a register search and detection circuit of the type described above which is capable of storing the information contained in the register during the search operation.

In accordance with these objects, this invention provides a search means adapted to scan any selected stage of a register, for example, a selected indicator core, to detect the presence of a bit therein, to generate an output if a bit is detected, and to continue the search on the succeeding stages of the register if a bit is not detected.

In a preferred embodiment of the invention, the search means includes a multistage circuit having means for applying a sampling or interrogation pulse to said circuit at the stage corresponding to the interrogated stage of the register. Means are provided to generate an output signal from a sampled stage of the circuit if the corresponding stage of the register has a bit therein. A sampling pulse applied to a stage of the circuit is normally propagated on to the succeeding stages by search continuing means to sample the register stages associated with these circuit stages but, if a bit is detected in a stage of the register, this sampling pulse propagation is inhibited. If, after locating a bit in a given position of the register, it is desired to continue the search on to succeeding positions, means are provided for reenergizing the search continuing means. The search continuing means is capable of continuing the search in either direction depending on the manner in which it is energized, either by a sampling pulse or by said reenergization means.

The foregoing and other objects, features and advantages of the invention will be apparent from the following more particular description of preferred embodiments of the invention, as illustrated in the accompanying drawings.

FIG. 1 shows an entire register search and detection system and is included for the purpose of setting the searching circuit of this invention in an exemplary utilitarian environment.

Figure 1:
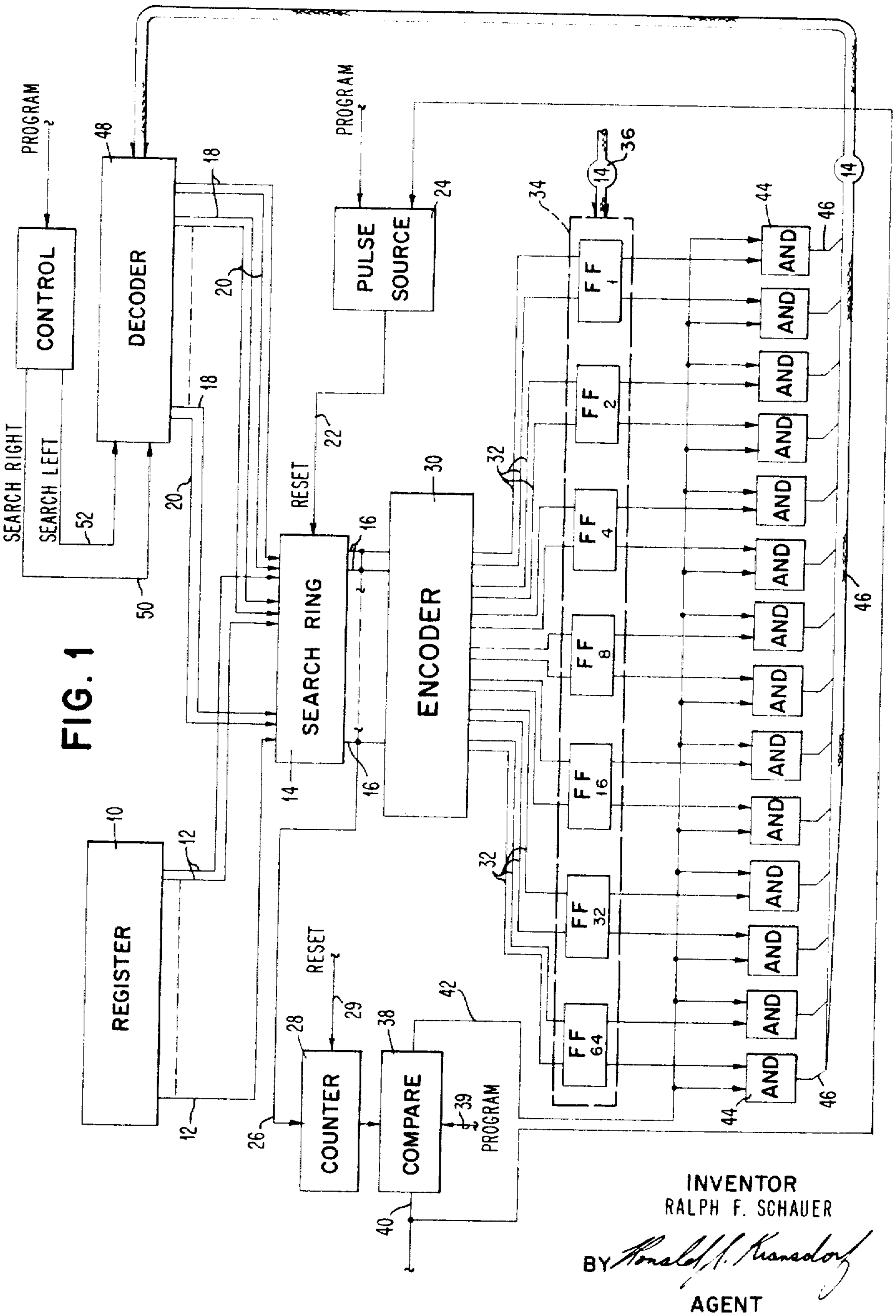
FIG. 1 is a block diagram of a register search and detection system in which the searching circuit of this invention is employed.

Referring to FIG. 1, there is shown a 128-stage register 10, the stages being designated 0–127, each stage of which may exist in either of two stable states. One of these states will be designated the ONE state and the other the ZERO state. When a stage of the register is in its ONE state, it will be said to have a bit stored therein. The individual stages of the register 10 may be conventional flip-flops which generate a continuous steady-state output when the stage is in its ONE state, or they may be some sort of pulse generating circuit, such as a magnetic core, which generates an output pulse when it is switched from its ONE to its ZERO state. For the purpose of describing the invention, the significance of the bits in register 10 and the manner in which they arrive there are of little importance. This register may, for example, be a row of magnetic cores in an identifier core plane, such as was previously described.

The outputs from register 10, whether they be D.C. potential levels or pulses, are applied over lines 12 to corresponding stages of search ring 14. The search ring is capable of storing the information contained in register 10 and of sequentially scanning this stored information until a bit is located. This sequential scanning may be started at any point in the ring and may proceed in either direction. The stages 0 and 127 are connected to form a closed search ring. When a bit is located in a stage of the ring, an output signal appears on the line 16 corresponding to that stage of the ring and the scan stops. The scan may be reinitiated starting with the succeeding stage to the right of that in which the bit was located by applying a signal to the line 18 corresponding to the stage in which the bit was found, or the search may be continued starting with the adjacent stage to the left of that in which the bit was found by applying a signal to the line 20 associated with the stage in which the bit was found. A pulse applied to reset-line 22 by pulse source 24 under control of an external device (not shown) resets all the stages of search ring 14 at the end of each search cycle and prepares the ring to search the new contents of register 10. The present invention lies in the search ring 14. A suitable search ring for use with the circuit shown in FIG. 1 will be described in detail later.

An output on any line 16 is applied through common line 26 to counter 28. A signal on a line 16 is also fed to encoder 30. An input to the encoder 30 causes outputs on seven of the fourteen lines 32, one line from each pair, to be applied to the seven flip-flops, FF1, FF2, FF4, FF8, FF16, FF32 and FF64 of address register 34. A signal on the left line 32 of each pair indicates the presence of a bit in that position and sets the flip-flop it is connected to, to its ONE state while a signal right line indicates the absence of a bit in that position (the not condition) and sets the associated flip-flop to its ZERO state. Register 34 indicates in which one of the 128 stages of register 10 the last bit detected was located. The flip-flops of address-register 34 may also be set by applying signals to seven of the fourteen lines 36 coming from an external control source. As will be seen later, this allows the external control circuit to determine where in the search ring 14 a particular search will begin.

The contents of counter 28 are compared in compare circuit 38 with a value set in the compare circuit over line 39 from the external control circuitry. This value is determined by the relative position of the desired information in the information sequence and is, in the indicator plane circuit previously described, equal to the number of indicator bits which must be detected before the desired address is found at the indicator level being sampled. When the comparison is successful, a signal goes out to the external control circuitry along line 40 to indicate that the desired address has been found and to, among other things, cause the resetting of the stages of search ring 14. When a comparison is unsuccessful, a signal on line 42 is applied to fourteen AND gates 44 to gate the outputs from flip-flops FF1–FF64 of address register 34 through seven of the AND gates 44 to energize seven of the fourteen lines 46. The lines 46 connected to AND gates 44 having the ONE side of a flip-flop FF1–FF64 as an input will hereafter be referred to as the 1 line, the 2 line, the 4 line . . . the 64 line, and the lines 46 connected to AND gates having the ZERO side of a flip-flop as an input will hereafter be referred to as the $\overline{1}$ line, the $\overline{2}$ line, the $\overline{4}$ line . . . the $\overline{64}$ line. The lines

46 are one of the inputs to decoder 48. The other inputs to this decoder are search-right line 50 and search-left line 52. When the search-right line 50 has a signal on it, the decoder 48 energizes the continue-right line 18 which corresponds to the address stored in address register 34. Similarly, when the search-left line 52 has a signal on it, the decoder 48 energizes the continue-left line 20 which corresponds to the address stored in address register 34.

Figure 2:
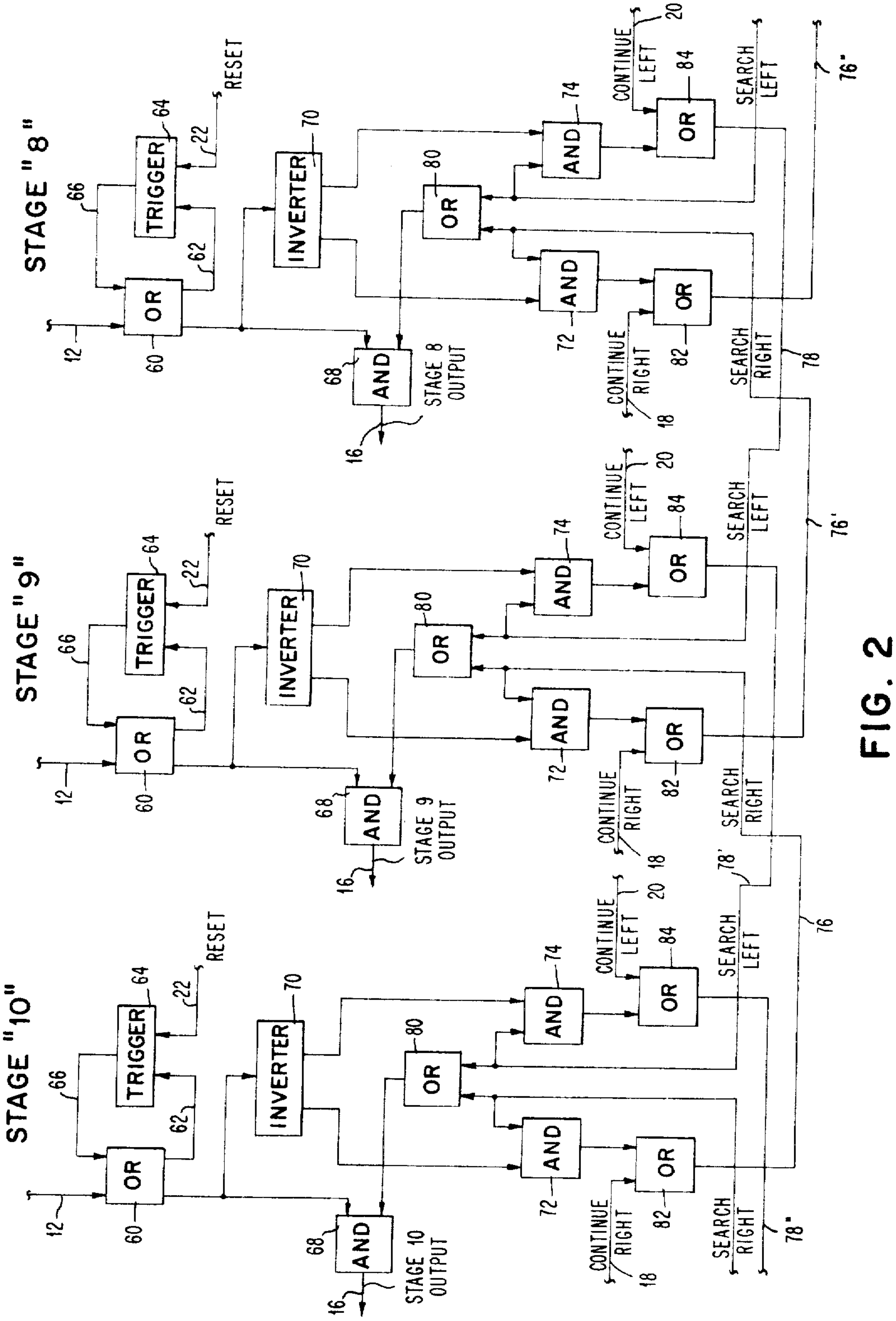
FIG. 2 is a block diagram of three stages of the search circuit of this invention.
Figure 3:
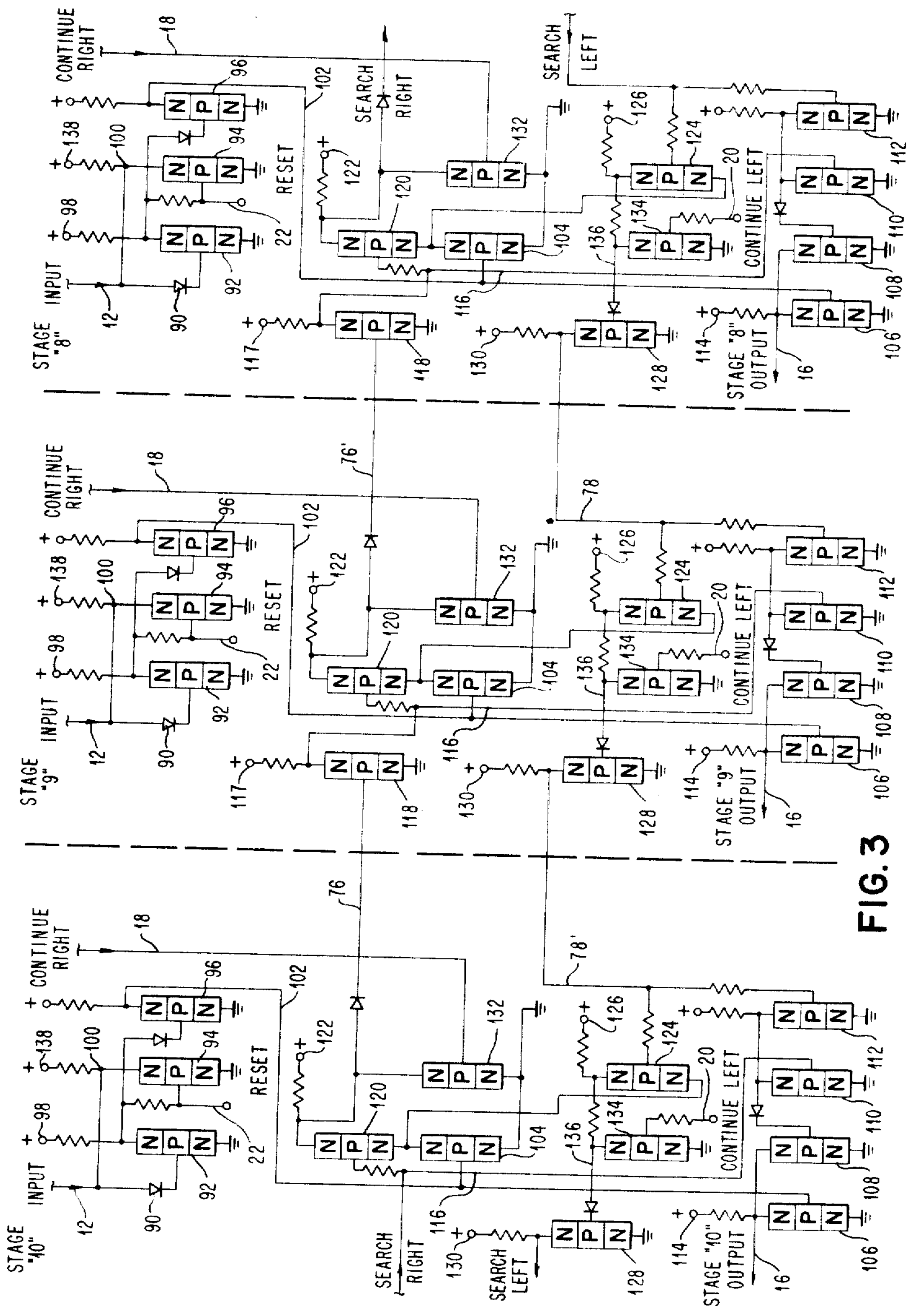
FIG. 3 is a schematic diagram of a transistorized embodiment of the circuit shown in FIG. 2.

From the above, it is apparent that search ring 14 of this invention is the key element of the searching system shown in FIG. 1. FIG. 2 is a detailed block diagram showing three stages of the preferred embodiment of the search ring. FIG. 3 shows three stages of a transistorized search ring which will perform the desired functions, but which does not necessarily bear an element to element correlation with the blocks shown in FIG. 2.

Referring first to FIG. 2, it is seen that the three stages designated "8," "9" and "10" are identical and, therefore, except where otherwise indicated, the following discussion will be with respect to stage 9 only.

The input coming from register 10 on line 12 is applied OR gate 60. As mentioned before, the signal on line 12 may be a D.C. potential level from, for example, the ONE side of a flip-flop, or it may be a pulse. While it is not shown in FIG. 2, the line 12 may also include a gate so that the signals on line 12 may be delayed until they are desired. A signal applied to OR gate 60 passes over line 62 to set trigger 64. The output from trigger 64 is fed back to the input of OR gate 60, thereby latching the stage of the circuit in its ONE state. The signal may, therefore, be removed from input line 12, as for example, by the termination of an input pulse, without affecting the operation of the scan ring. An output from OR gate 60 is also applied to partially condition output AND gate 68 and is applied through inverter 70 to decondition AND gates 72 and 74. A search-right signal on search-right line 76 or a search-left signal on search-left line 78 passes through OR gate 80 to apply the other conditioning input to AND gate 68. Therefore, an output appears on output line 16 of stage 9 only if this stage has been latched to its ONE state and a search-right or a search-left signal has been applied to its OR gate 80 indicating a search of this stage. This search-right signal, which is derived in a manner to be described later, comes from OR gate 82 of stage 10, while a search-left signal is derived from OR gate 84 of stage 8. The search-right signal on line 76 is also applied to AND gate 72 of stage 9. If this stage were not latched in its ONE state, AND gate 72 would be conditioned by the signal from inverter 70 and would generate an output which would pass through OR gate 82 to be applied to search-right line 76′ leading to OR gate 80 of stage 8. Therefore, if a search-right signal is applied to a stage of the search ring, and finds this stage in its ZERO condiiton (i.e., finds that the corresponding stage of register 10 contains a ZERO), the search-right signal is propagated on to the next succeeding stage. Similarly, a search-left signal coming in on line 78 is applied to condition AND gate 74. If the circuit is unlatched, inverter 70 applies the other conditioning signal to AND gate 74, causing an output from this gate which passes through OR gate 84 to be applied through search-left line 78′ to OR gate 80 of stage 10. Therefore, if a search-left signal applied to a stage of the search ring finds the stage in its unlatched condition, the search-left signal is propagated on to the next succeding stage.

When stage 9 is latched so as to inhibit an output from AND gate 72, and it is desired to continue the search on to stage 8 anyway, a continue-right signal is applied to line 18, which signal passes through OR gate 82 to search-right line 76′. Similarly, a continue-left signal applied to line 20 passes through OR gate 84 and search-left line 78′ to be applied to OR gate 80 of stage 10. Therefore, by use of lines 18 and 20, a search may be continued on to succeeding stages until the desired information is located.

Referring now to FIG. 3 and again considering only stage 9 except where otherwise indicated, it is seen that an input on line 12 is applied through diode 90 to the base of transistor 92. When the circuit is in its unlatched condition, this transistor is conducting, while transistors 94 and 96 are cut off. A ground potential level applied to the base of transistor 92 indicates the presence of a ONE in the corresponding stage of register 10 and causes transistor 92 to be cut off. Transistor 92 being cut off causes the positive potential level of terminal 98 to be simultaneously applied to the bases of transistors 94 and 96, causing these transistors to conduct. Transistor 94 conducting lowers the potential level of the point 100. This potential is applied to the base of transistor 92, thereby latching the circuit in its ONE condition after the input signal on line 12 is removed. Transistor 96 conducting reduces the potential on line 102 to ground, thereby causing transistors 104 and 106 to be cut off. However, since transistor 108 is normally conducting, output line 16 will remain at ground potential. If, however, transistor 110 or transistor 112, which transistors are normally cut off, is rendered conductive, transistor 108 will be cut off by the ground potential applied to its base and the positive potential at terminal 114 will be applied to output line 16, indicating that a ONE was detected in stage 9. Transistor 110 is rendered conductive by a positive potential on line 116, which is derived from terminal 117 when transistor 118 is cut off by a ground potential applied to line 76 from the succeeding stage 10. Transistor 112 is rendered conductive by a positive potential applied to line 78 by the preceding stage of the search ring, stage 8.

The positive potential from terminal 117, when transistor 118 is cut off, is also applied to the base of transistor 120 to attempt to render this transistor conductive. If stage 9 is unlatched at this time, transistor 104 will be conducting and the positive potential applied to the base of transistor 120 will render this transistor conductive also, causing a ground potential to be applied to search-right line 76′, and allowing the search to be continued on to preceding stage 8. If, however, stage 9 of the search ring is latched in its ONE state, transistor 104 will be cut off by the ground potential applied to its base by line 102 and will prevent transistor 120 from conducting. The positive potential from terminal 122 will, therefore, be applied to line 76′ and the search will not be continued on to stage 8.

Similarly, the positive potential applied to line 78 will also be applied to the base of transistor 124 to attempt to render this transistor conducting. Transistor 104 will operate in the same way as it did with transistor 120 to either allow or prevent conduction in transistor 124. Therefore, if the circuit is latched, the positive potential at terminal 126 will be applied to the base of transistor 128, rendering this transistor conductive and causing a ground potential to be applied to search-left line 78′, thereby preventing the search from continuing on to stage 10. If stage 9 is unlatched, transistors 104 and 124 will be conductive, applying a ground potential to the base of transistor 128 to cut this transistor off, allowing the positive potential at terminal 130 to be applied to line 78′ to continue the search on to stage 10.

If stage 9 is in its latched condition but the desired number of bits have not yet been located and it is desired to continue the search to the right, a positive pulse may be applied to continue-right line 18 to turn on normally-cut-off transistor 132, applying a ground potential to line 76′ to continue the search to the right. Similarly, if under the above conditions, it is desired to continue the search to the left, a positive potential may be applied to continue-left line 20 to render normally-cut-off transistor 134 conductive, applying a ground potential to line 136 to cut off transistor 128, causing the required positive potential to be applied to line 78′ to continue the search to the left.

At the end of a search cycle, a ground potential is applied to line 22 to cut off transistor 94, thus causing a positive potential from terminal 138 to be applied to the base of transistor 92, rendering this transistor conductive. In this way, stage 9 of the search ring is reset to its ZERO state.

*Operation*

The operation of this invention will now be further illustrated by use of a specific example.

While this example will be with reference to both the circuit shown in FIG. 1 and that shown in FIG. 2, it is to be understood that the circuit shown in FIG. 1 is not part of this invention and that it is included merely for the purpose of illustrating the operation of the invention (the circuit shown in FIG. 2) in a specific environment.

For this illustrative example, assume that the bits originally stored in register 10 represent the addresses in a memory at which individual records begin. After the desired record has been located, these bits will be replaced in register 10 by bits representing the addresses in which individual fields of the records start. Assume further that it is desired to locate the address in memory at which the next-to-the-last field of the second record begins.

The operations to be performed will, therefore, be:

(1) Read the original content of register 10 into search ring 14.

(2) Start scanning at position zero of search ring 14 and search left until the first bit is located.

(3) Continue the search left until the third bit has been located.

(4) Store this address in address registers 34 and reset search ring 14.

(5) Read the field bits now stored in register 10 into search ring 14.

(6) Search right in search ring 14 starting at the address indicated in address register 34 until the second bit is located.

(7) Start the read-out from the memory at the address indicated in address register 34.

Referring now to FIG. 1, the first of the above operations may be performed in any suitable manner. For example, if register 10 is a bank of magnetic cores, the cores would be reset causing pulses to appear on lines 12. These pulses would be applied to the corresponding OR gates 60 (FIG. 2) to set the triggers 64. If register 10 was a bank of flip-flops, the information would be applied directly to the search ring 14 over lines 12 as soon as the information was read into register 10, or, the information could be gated into the search ring 14 by gates in the search lines 12 (not shown). In any event, at the end of the read-out operation the triggers 64 of the stages of the search ring 14 corresponding to the stages of register 10 which originally contained ONE bits are all set to apply the required potential level to their respective OR gates 60.

At the beginning of the search operation, the following circuit conditions will exist:

(1) Address register 34 is set to record the address "127" by signals applied to suitable lines 36 from the external control circuitry.

(2) Counter 28 is set to zero by a signal applied to its reset line 29.

(3) The number "three" is set into compare circuit 38 by signals applied to line 39 from external control circuitry.

(4) The triggers 64 in search ring 14 are set in accordance with the original contents of register 10.

(5) Search-left line 52 is energized and search-right line 50 deenergized.

Since counter 28 is set to zero, and the number three is stored in the compare circuit 38, there will be a failure of comparison in the compare circuit, and a signal will appear on line 42 to gate the output potentials from the address register through AND gates 44 and lines 46 to decoder 48. With the number 127 set into address register 34 and the search-left line energized, the decoder will generate an output on its output line 20 for the 127th stage which output will be aplied to OR gate 84 (FIG. 2) of stage 127. The output on line 78 from this gate will be applied to OR gate 80 of stage zero to cause this stage to be sampled.

Assume that stage zero of search ring 14 is in the ONE state, that stages 15 and 30 are also in the ONE state, and that all of the intermediate stages of search ring 14 are in the ZERO state. Since stage zero is in the ONE state, its OR gate 60 will apply a conditioning signal to its AND gate 68 so that when OR gate 80 is energized by the signal on line 78, an output will appear on output line 16 for the zero stage. Since inverter 70 also has a signal applied to it by OR gate 60, AND gate 74 will not be conditioned so that OR gate 84 will not apply a signal to line 78 to carry the search on to stage 1.

The signal on output line 16 for the zero stage of search ring 14, will be applied to encoder 30 causing output signals on the $\overline{64}$, $\overline{32}$, $\overline{16}$, $\overline{8}$, $\overline{4}$, $\overline{2}$, and $\overline{1}$ output lines 32. The signals on these lines 32 will be applied to address register 34 to set its flip-flops to read zero.

The output on the zero-stage output line 16 will also be applied to line 26 to step counter 28 one position to register a count of one. The number stored in counter 28 will be compared with the number three stored in compare circuit 38, and, since there is a failure of comparison, an output signal will be generated on line 42. This will energize AND gates 44 causing signals on all the not output-lines 46 to be applied to decoder 48 where they, in conjunction with the signal on search-left line 52 will cause an output signal to appear on the line 20 for the zero stage. This signal will be applied to OR gate 84 of the zero stage causing an output signal on its search-left line 78 which will energize OR gate 80 of stage 1. Since stage 1 is in its ZERO state, its AND gate 68 will not be conditioned by a signal from its OR gate 60 and no output signal will appear on the output line 16 of this stage. Since inverter 70 for this stage is not energized by a signal from OR gate 60, AND gate 74 will be conditioned to pass the search-left signal on line 78 through OR gate 84 and on to stage 2.

The search-left signal will in this manner be propagated down the search ring 14 until the next one bit is encountered in stage 15. Here, as with stage zero, the AND gate 68 will be conditioned by a signal from OR gate 60 to pass an output signal onto the stage 15 output line 16, and the AND gate 74 will be deconditioned by the signal from inverter 70 to prevent the propagation of the search-left signal on to stage 16. The output signal on the line 16 of stage 15 will be encoded in encoder 30 to set the address 15 via the $\overline{64}$, $\overline{32}$, $\overline{16}$, 8, 4, 2, 1 lines 32, into address register 34 and will be passed through line 26 to step counter 28 one position to register a count of two. Since the number stored in counter 28 still does not agree with the number three stored in compare circuit 38, an output signal will appear on line 42 to gate the address information in address register 34 into decoder 48 to cause an output signal on the continue-left line 20 for stage 15.

The search-left signal will again be propagated down the search ring 14 until the next one bit is detected in stage 30. The output on the stage 30 output line 16 will be encoded in encoder 30 to cause address register 34 to be set to store the address 30 of this stage, via lines $\overline{64}$, $\overline{32}$, 16, 8, 4, 2, $\overline{1}$. This output will also be passed through line 26 to step counter 28 one position to a count of three. Since the number three now stored in counter 28 agrees with the number stored in compare circuit 38, an output signal will be generated on line 40 which will, through circuitry not shown:

(1) Cause the record information stored in register 10 to be replaced by the bits representing the addresses in memory at which fields begin.

(2) Cause a reset pulse to be applied by pulse source 24 to reset-line 22 to reset all of the triggers 64 of search ring 14.

(3) Cause counter 28 to be reset to zero.

(4) Cause the number "two" to be read into compare circuit 38.

(5) Cause search-right line 50 to be energized and search-left line 52 to be deenergized.

The circuit is now ready to start the search-right operation to locate the address at which the next-to-the-last field of the second record begins.

Assume that fields start at every third address position, starting with the zero position. The first steps here, as before, would be to read the contents of register 10 into the search ring 14. This operation will be performed in exactly the same manner as when the contents of the register was the beginning of record information, and will not be described again here. Since the number stored in counter 28 (zero) is not the same as the number two stored in compare circuit 38, line 42 will be energized to apply the address stored in address register 34 through lines 46 to decoder 48. Since search-right line 50 is now energized, the decoder will generate an output on the line 18 for stage 30 rather than on the line 20 for this stage which output will be applied through the stage 30 OR gate 82 and search-right line 76 to OR gate 80 of stage 29. Since stage 29 is in its ZERO state, its AND gate 68 will not be conditioned by an output from its OR gate 60 and no output will appear on its output line 16. Also, since inverter 70 of stage 29 is not energized, AND gate 72 of this stage will be conditioned to pass the signal coming in on search-right line 76 through OR gate 82 to the search-right line 76 leading to OR gate 80 of stage 28. The signal will in this way be propagated until the next ONE bit is detected in stage 27.

Since stage 27 is in its ONE state, the output from OR gate 80 will be passed through conditioned AND gate 68 to the stage 27 output line 16. Inverter 70 of stage 27 will also be energized to decondition its AND gate 72 preventing the propagation of the search-right signal on to stage 26. The output signal on line 16 of stage 27 will be encoded in encoder 30 to cause the setting of the flip-flops in address register 34 to store the address 27. This signal will also pass through line 26 to step counter 28 one position to a count of one. Since the number stored in the counter 28 does not agree with the number two stored in compare circuit 38 a signal will appear on line 40 to gate the number 27 stored in address register 34 through lines 46 to decoder 48 causing a signal to appear on continue-right line 18 for stage 27. This signal will pass through OR gate 82 of stage 27 and be applied through line 76 to OR gate 80 of stage 26. Since stage 26 is in its ZERO state the signal will pass throughout its conditioned AND gate 72, its OR gate 82, and its line 76 to be applied to OR gate 80 of stage 25. Stage 25 is also in its ZERO state and the signal will therefore be passed on to OR gate 80 of stage 24. Stage 24 is in its ONE state, and an output will therefore be generated on output line 16 of stage 24. As before, the energized inverter 70 will decondition AND gate 72 preventing the search from continuing on to adjacent positions.

The signal on output line 16 of stage 24 will pass through encoder 30 to set the flip-flops of address register 34 to store the address 24. This signal will also pass through line 26 to step counter 28 to read the value "two." Since this value is equal to the value stored in compare circuit 38, there will be an output on line 40 which will indicate that the address now stored in address register 34, address 24, is the address at which the desired information starts. Since the search operation has been completed, the circuit will be reset to prepare for the next search operation.

While, in the above example, the circuit has been described with reference to its application as a memory address locator for a random access memory, it is to be understood that this was merely done for convenience of illustration and that the circuit is in nowise limited to this application.

While the invention has been particularly shown and described with reference to a preferred embodiment thereof, it will be understood by those skilled in the art that various changes in form and details may be made therein without departing from the spirit and scope of the invention.

What is claimed is:

1. A multistage circuit for interrogating any selected stage of a multistage register for a bit of information and for continuing the search to succeeding stages of the register until the bit is found, there being a stage in said circuit corresponding to each stage of said register, comprising:
means for interrogating said register to detect the presence of bits in the stages thereof;
means for applying a sampling pulse to said circuit at the stage corresponding to a selected stage of said register;
means responsive to the coincident occurrence of a bit in said selected stage and of said sampling pulse for generating an output signal;
search continuing means normally responsive to the application of said sampling pulse to said circuit stage for applying a sampling pulse to the next succeeding stage of said circuitry in one direction;
and means responsive to the detection of said bit in said selected register stage for inhibiting said search continuing means.

2. A circuit as described in claim 1 characterized by:
each stage of said circuit including means responsive to the detection of a said information bit in the selected stage of said register for storing a bit in the corresponding stage of said circuit;
and means for resetting said stage of the circuit.

3. A circuit as described in claim 1 characterized by:
second means operable for applying a sampling pulse to said circuit at the stage corresponding to said selected stage of said register, said search continuing means being normally responsive to the application of an interrogation pulse from said second sampling pulse applying means for applying a sample pulse to the next succeeding stage of the circuit in the opposite direction.

4. A circuit as described in claim 1 above characterized by:
means for reenergizing said search continuing means after being inhibited by the detection of a bit in said selected stage to continue the search on to a succeeding stage.

5. A circuit as described in claim 4 above characterized by said reenergizing means including:
first means operable to continue said search to a succeeding stage in said one direction and
second means operable to continue said search to a succeeding stage in the opposite direction.

6. A. multistage circuit for interrogating any selected stage of a register for a bit of information and for continuing the search on to preceding or succeeding stages of the register until the bit is found comprising:
means for storing the contents of each stage of said register in the corresponding stage of said circuit;
means for applying a first sampling signal to any selected stage of said circuit;
first propagation means normally responsive to the application of said first sampling signal to a stage of said circuit for applying a sampling signal to the preceding stage of said circuit;
means for applying a second sampling signal to any selected stage of said circuit;
second propagation means normally responsive to the application of said second sampling signal to a stage of said circuit for applying a sampling signal to the succeeding stage of said circuit;
means responsive to the storage of a bit in the stage of said circuit for inhibiting said first and second propagation means;
and means responsive to the combined occurrence of a bit stored in a stage of said circuit and the application of a sampling signal to that stage of the circuit for generating an output signal from that stage of the circuit.

References Cited by the Examiner

UNITED STATES PATENTS 3,077,580 2/1963 Underwood ------- 340—172.5
3,108,256 10/1963 Buchholz et al. ---- 340—172.5

OTHER REFERENCES

IBM 1401 Data Processing System: Reference Manual A24-1403-4; 1960 (pp. 15–44 relied on, copy in Group 240).

ROBERT C. BAILEY, *Primary Examiner.*

P. J. HENON, *Assistant Examiner.*